(12) United States Patent
Belhekar et al.

(10) Patent No.: US 9,767,176 B2
(45) Date of Patent: Sep. 19, 2017

(54) DENORMALIZE RECURSIVE, UNBALANCED, AND RAGGED HIERARCHIES

(71) Applicant: Bank of America Corporation, Charlotte, NC (US)

(72) Inventors: Durgadatta Belhekar, Charlotte, NC (US); Akheel Ap Khan Mohammed, Telangana, IN (US); Daniel Darnadi Widjanarko, Alpharetta, GA (US)

(73) Assignee: Bank of America Corporation, Charlotte, NC (US)

( * ) Notice: Subject to any disclaimer, the term of this patent is extended or adjusted under 35 U.S.C. 154(b) by 554 days.

(21) Appl. No.: 14/453,963

(22) Filed: Aug. 7, 2014

(65) Prior Publication Data
US 2016/0042048 A1    Feb. 11, 2016

(51) Int. Cl.
G06F 17/30    (2006.01)

(52) U.S. Cl.
CPC .. *G06F 17/30569* (2013.01); *G06F 17/30592* (2013.01); *G06F 17/30589* (2013.01)

(58) Field of Classification Search
CPC ......... G06F 17/30289; G06F 17/30589; G06F 17/30917; G06F 17/30569
See application file for complete search history.

(56) References Cited

U.S. PATENT DOCUMENTS

| | | | | |
|---|---|---|---|---|
| 5,295,256 A * | 3/1994 | Bapat | ................ | G06F 17/30595 707/999.003 |
| 6,453,452 B1 * | 9/2002 | Chang | ................ | G06F 17/5068 430/5 |
| 6,768,986 B2 | 7/2004 | Cras et al. | | |
| 7,181,440 B2 | 2/2007 | Cras et al. | | |
| 7,571,182 B1 * | 8/2009 | Eddy | ................ | G06F 17/30595 |
| 7,664,777 B2 | 2/2010 | Cras et al. | | |
| 7,870,016 B2 * | 1/2011 | Fazal | ................ | G06Q 10/0637 705/7.36 |
| 8,006,207 B2 * | 8/2011 | Finkler | ............... | G06F 17/5081 716/111 |

(Continued)

OTHER PUBLICATIONS

Microsoft Business Intelligence and Data Warehousing, "Flattening a parent-child hierarchy", Jan. 16, 2011, p. 1-4.*

*Primary Examiner* — Heather Herndon
*Assistant Examiner* — Merilyn Nguyen
(74) *Attorney, Agent, or Firm* — Michael A. Springs; Moore & Van Allen PLLC; Patrick B. Horne (57) ABSTRACT

Embodiments disclosed herein relate to systems, methods, and computer program products for transforming an unstructured database into a structured database. In some embodiments, the system and method imports an unstructured database comprising entities and a hierarchy associated with the entities. The system and method analyze the unstructured database, flatten the database so that a recursive database is converted into a database that fully expands all entities into lower levels, and identifies instances of unbalanced or ragged hierarchies. The system populates the database according to predetermined rules to address the unbalanced or ragged hierarchies and outputs a structured database that can be used for accurate analysis of the hierarchy and entities stored therein, such as corporate structure hierarchies or stock inventory hierarchies.

20 Claims, 6 Drawing Sheets

(56) References Cited

U.S. PATENT DOCUMENTS

| | | | | |
|---|---|---|---|---|
| 9,305,076 B1* | 4/2016 | Kadarkarai | ........ | G06F 17/30598 |
| 2005/0065910 A1* | 3/2005 | Welton | .............. | G06F 17/30489 |
| 2005/0080792 A1* | 4/2005 | Ghatare | ............ | G06F 17/30569 |
| 2006/0173873 A1* | 8/2006 | Prompt | ............. | G06F 17/30569 |
| 2007/0027904 A1* | 2/2007 | Chow | ............... | G06F 17/30592 |
| 2007/0239769 A1* | 10/2007 | Fazal | ................. | G06F 17/30554 |
| 2008/0243876 A1* | 10/2008 | Godoy | ............. | G06F 17/30604 |
| 2009/0319546 A1* | 12/2009 | Shaik | ................ | G06F 17/30563 |
| 2010/0106747 A1* | 4/2010 | Honzal | ............ | G06F 17/30592 |
| | | | | 707/803 |
| 2011/0078201 A1* | 3/2011 | Ryan | ................ | G06F 17/30327 |
| | | | | 707/792 |
| 2011/0131173 A1* | 6/2011 | Fernandez Ortega | ............ | G06F 17/30386 |
| | | | | 707/602 |
| 2011/0295836 A1* | 12/2011 | Bolsius | ................. | G06Q 10/10 |
| | | | | 707/714 |
| 2013/0232539 A1* | 9/2013 | Polunin | ............... | G06Q 10/047 |
| | | | | 726/1 |
| 2014/0068718 A1* | 3/2014 | Mureinik | ............. | G06F 21/604 |
| | | | | 726/4 |
| 2014/0279628 A1* | 9/2014 | Straznitskas | ......... | G06Q 10/105 |
| | | | | 705/320 |

* cited by examiner

| ID_1 | NAME_1 | ID_2 | NAME_2 | ID_3 | NAME_3 | ID_4 | NAME_4 | COMMENT |
|---|---|---|---|---|---|---|---|---|
| 1 | HIGH LEVEL 1 | 2 | MID LEVEL 1 | 4 | LOW LEVEL 1 | 7 | LOWEST LEVEL 1 | FIRST BRANCH IN HIERARCHY |
| 1 | HIGH LEVEL 1 | 1 | HIGH LEVEL 1 | 1 | HIGH LEVEL 1 | 1 | HIGH LEVEL 1 | POPULATING HIGHEST LEVEL DOWN |
| 1 | HIGH LEVEL 1 | 3 | MID LEVEL 2 | 5 | LOW LEVEL 2 | 5 | LOW LEVEL 2 | SECOND BRANCH IN HIERARCHY; ADDRESSING UNBALANCED HIERARCHY |
| 1 | HIGH LEVEL 1 | 1 | HIGH LEVEL 1 | 6 | LOW LEVEL 3 | 6 | LOW LEVEL 3 | THIRD BRANCH IN HIERARCHY; ADDRESSING RAGGED HIERARCHY |
| 1 | HIGH LEVEL 1 | 2 | MID LEVEL 1 | 2 | MID LEVEL 1 | 2 | MID LEVEL 1 | POPULATING MID LEVEL DOWN IN FIRST BRANCH OF HIERARCHY |
| 1 | HIGH LEVEL 1 | 3 | MID LEVEL 2 | 3 | MID LEVEL 2 | 3 | MID LEVEL 2 | POPULATING MID LEVEL DOWN IN SECOND BRANCH OF HIERARCHY |
| 1 | HIGH LEVEL 1 | 2 | MID LEVEL 1 | 4 | LOW LEVEL 1 | 4 | LOW LEVEL 1 | POPULATING LOW LEVEL DOWN IN FIRST BRANCH OF HIERARCHY |

FIG. 6

DENORMALIZE RECURSIVE, UNBALANCED, AND RAGGED HIERARCHIES

BACKGROUND

Databases are used in all manners of businesses in order to track people and products associated with the business, but often these databases are in a recursive format that is difficult to analyze using business intelligence tools. The majority of business intelligence tools do not support recursive or normalized data that cannot be leveraged. In these situations, individuals or products may not have parent information associated with them, resulting in inaccurate counts of individuals or products.

Further, standard databases do not take into account that individuals at higher levels of the hierarchy are capable of performing tasks associated with lower level individuals. Thus, the lower level tasks performed by these higher level individuals may be missed when tasks are counted.

Thus, there is a need for a system and method that transform unstructured databases into a structured database. The system and method is capable of handling the aforementioned issues without manual intervention and by altering the output based on the results of the analysis.

BRIEF SUMMARY

The following presents a simplified summary of one or more embodiments of the disclosure in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments disclosed herein address the above needs and/or achieve other advantages by providing an apparatus (e.g., a system, computer program product, and/or other device) and a computer-implemented method for updating a development database. In some embodiments, the system identifies a development database that serves as a test environment for one or more applications and identifies production databases associated with the development database. Differences accumulate between the development database and the associated production database over time and these differences can cause issues with the applications that are tested in the development database but implemented in the production database. For this reason, users desire the development database to be updated with the features, e.g., the structure, of the production database. In some embodiments, the system extracts a schema of the development database and the associated production database, compares the schema, and determines a drift score, which is a measure of the difference between the development database and the associated production database. The drift score is then compared to a predetermined threshold to determine whether the development database should be updated.

In a first aspect, an apparatus for transforming an unstructured database, wherein the apparatus transforms the unstructured database into a structured database, is provided. In some embodiments, the apparatus includes a memory; a computing processor; and a module stored in the memory, said module comprising instruction code executable by one or more computing processors, and configured to cause the one or more computing processors to: import an unstructured database into a computing device system, the unstructured database comprising a plurality of entities in a hierarchy of levels; analyze the unstructured database to identify relationships between the entities in the hierarchy; generate a flattened hierarchy by expanding entities from higher levels into lower levels of the hierarchy such that every entity is present in a lowest level at least once; determine one or more instances of unbalanced or ragged hierarchies in the unstructured database, wherein: an unbalanced hierarchy is a hierarchy having branches of unequal length, and a ragged hierarchy is a hierarchy where at least one entity below a highest level does not have a direct supervisor; populate the flattened hierarchy according to predetermined rules in order to develop relationships between the one or more instance of the unbalanced or ragged hierarchies and the remaining entities in the hierarchy; and provide an output of a structured database comprising the populated, flattened hierarchy.

In some embodiments, the entities include individuals in a corporate structure hierarchy, and the hierarchy of levels include supervisors and subordinates. In further embodiments, the predetermined rules specify that entities in unbalanced and ragged hierarchies will be ultimately subordinate to the highest level in the hierarchy, and wherein the populating fills higher levels to the unbalanced and ragged hierarchies with the highest level in the hierarchy. In yet still further embodiments, the output is a graphical user interface that modifies a presentation based on the results of the analysis. For example, the graphical user interface may display populated entities in a different manner from entities originally present in the unstructured database. In still further embodiments, importing the unstructured database includes receiving a link to the unstructured database from a user. In some embodiments, the module further comprises instruction code executable by one or more computing processors, and configured to cause the one or more computing processors to: query a user for a level of an entity in a ragged hierarchy when the ragged entity is not defined by a level in the unstructured database.

In another aspect, a computer program product for transforming an unstructured database, wherein the apparatus transforms the unstructured database into a structured database, is provided. In some embodiments, the computer program product includes a non-transitory computer-readable medium comprising: an executable portion for causing a computer to import an unstructured database into a computing device system, the unstructured database comprising a plurality of entities in a hierarchy of levels; an executable portion for causing a computer to analyze the unstructured database to identify relationships between the entities in the hierarchy; an executable portion for causing a computer to generate a flattened hierarchy by expanding entities from higher levels into lower levels of the hierarchy such that every entity is present in a lowest level at least once; an executable portion for causing a computer to determine one or more instances of unbalanced or ragged hierarchies in the unstructured database, wherein: an unbalanced hierarchy is a is a hierarchy having branches of unequal length, and a ragged hierarchy is a hierarchy where at least one entity below a highest level does not have a direct supervisor; an executable portion for causing a computer to populate the flattened hierarchy according to predetermined rules in order to develop relationships between the one or more instance of the unbalanced or ragged hierarchies and the remaining entities in the hierarchy; and an executable portion for causing a computer to provide an output of a structured database comprising the populated, flattened hierarchy.

In some embodiments, the non-transitory computer readable medium includes an executable portion for causing a computer to query a user for a level of an entity in a ragged hierarchy when the ragged entity is not defined by a level in the unstructured database.

In a further aspect, a computer-implemented method for transforming an unstructured database, wherein the apparatus transforms the unstructured database into a structured database, is provided. In some embodiments, the method includes importing an unstructured database into a computing device system, the unstructured database comprising a plurality of entities in a hierarchy of levels; analyzing the unstructured database to identify relationships between the entities in the hierarchy; generating a flattened hierarchy by expanding entities from higher levels into lower levels of the hierarchy such that every entity is present in a lowest level at least once; determining one or more instances of unbalanced or ragged hierarchies in the unstructured database, wherein: an unbalanced hierarchy is a hierarchy having branches of unequal length, and a ragged hierarchy is a hierarchy where at least one entity below a highest level does not have a direct supervisor; populating the flattened hierarchy according to predetermined rules in order to develop relationships between the one or more instance of the unbalanced or ragged hierarchies and the remaining entities in the hierarchy; and providing an output of a structured database comprising the populated, flattened hierarchy.

Other aspects and features, as recited by the claims, will become apparent to those skilled in the art upon review of the following non-limited detailed description of the disclosure in conjunction with the accompanying figures.

BRIEF DESCRIPTION OF THE SEVERAL VIEWS OF THE DRAWINGS

Having thus described embodiments in general terms, reference will now be made to the accompanying drawings, which are not necessarily drawn to scale, and wherein:

DETAILED DESCRIPTION

Embodiments will now be described more fully hereinafter with reference to the accompanying drawings, in which some, but not all, embodiments are shown. Indeed, the disclosure may be embodied in many different forms and should not be construed as limited to the embodiments set forth herein; rather, these embodiments are provided so that this disclosure may satisfy applicable legal requirements. Like numbers refer to like elements throughout.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." It should also be understood that while some embodiments describe the methods or products as comprising one or more elements, the methods or elements may also consist of or consist essentially of the elements disclosed herein.

It should be understood that terms like "bank," "financial institution," and "institution" are used herein in their broadest sense. Institutions, organizations, or even individuals that process financial transactions are widely varied in their organization and structure. Terms like "financial institution" are intended to encompass all such possibilities, including but not limited to banks, finance companies, stock brokerages, credit unions, savings and loans, mortgage companies, insurance companies, and/or the like. Additionally, disclosed embodiments may suggest or illustrate the use of agencies or contractors external to the financial institution to perform some of the calculations, data delivery services, and/or authentication services. These illustrations are examples only, and an institution or business can implement the entire method and system on their own computer systems or even a single work station if appropriate databases are present and can be accessed.

Figure 1:
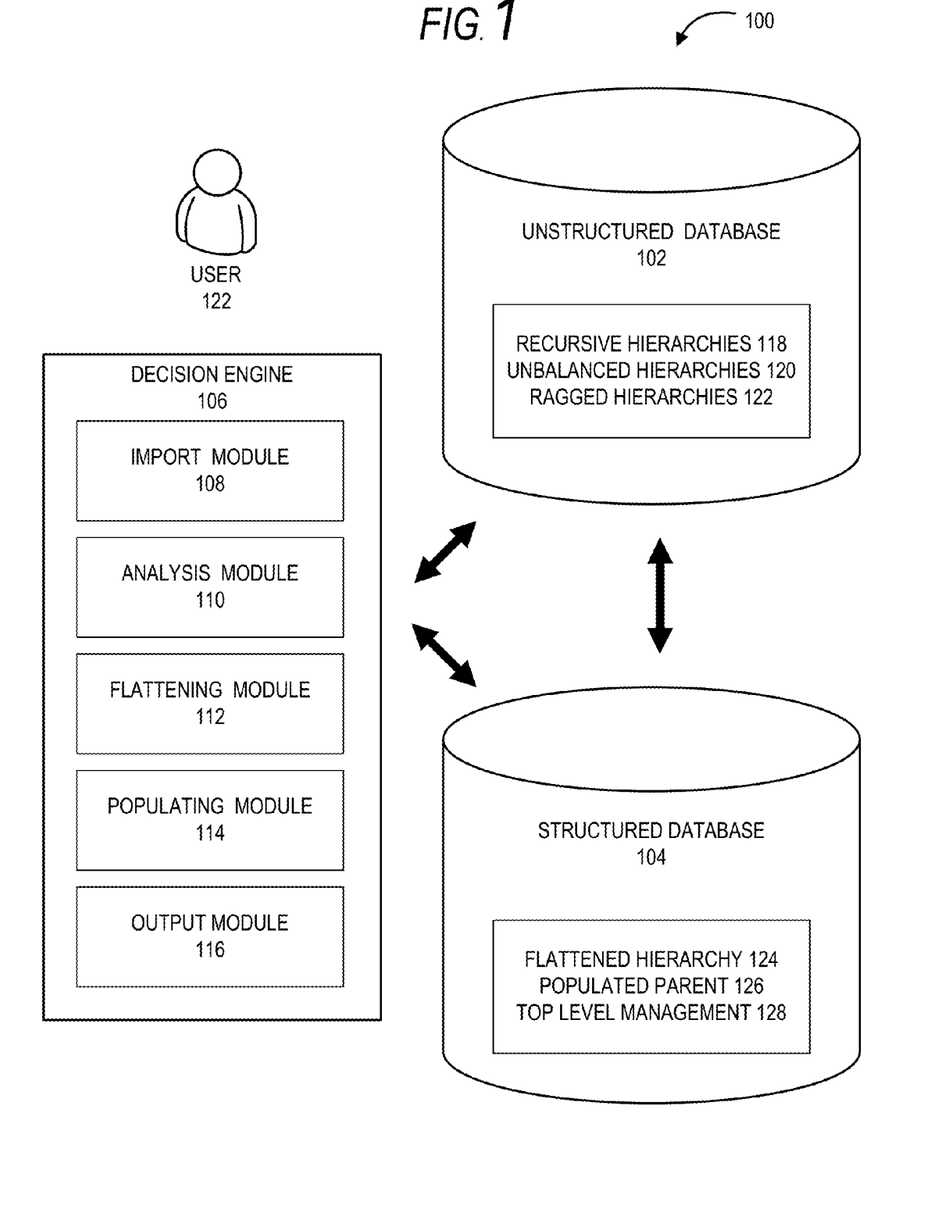
FIG. 1 provides an structured database environment wherein an unstructured database is transformed into a structured database, in accordance with one embodiment of the present disclosure.

FIG. 1 illustrates an environment 100 in which an unstructured database 102 is transformed into a structured database 104 by a decision engine 106, e.g., a computing device processor programmed to carry out steps to transform the unstructured database as disclosed herein. In some embodiments, the decision engine 106 imports the unstructured database 102 into the decision engine 106, analyzes the unstructured database 102 to identify entities and a hierarchy between the entities, and transforms the unstructured database 102 into a structured database 104 by flattening and populating the unstructured database according to one or more rules. In some embodiments, the decision engine also outputs the structured database and/or one or more sets of data associated with the structured database.

In an embodiment, the decision engine 106 includes an import module 108. In some embodiments, the import module 108 receives data from a user and imports it into the system for manipulation. For example, the import module 108 may receive a link to a file that includes the unstructured database 102. In some embodiments, the import module is configured to receive a link to an address on a computer network, such as an FTP or URL address. In some embodiments, the import module 108 is configured to access a database. The database may comprise tables, spreadsheets, and/or graphical depictions of the data and relationships in the database. The import module 108 imports the unstructured database 102 for use by the decision engine 106.

In some embodiments, the decision engine 106 includes an analysis module 110. In an embodiment, the analysis module 110 takes the imported unstructured database 102 and analyzes the data to identify the entities in the database as well as the relationships between the entities in the database. In an exemplary embodiment, entities are the data that make up the database. For example, the entities may be individuals within a corporate structure hierarchy (e.g., CEO, supervisors, workers). It should be understood that the entities may be various types of people or objects in a hierarchy. For example, the entities may be products in a business. Another example is when the unstructured database comprises the assets of a business such as in a clothing store. The entities in the hierarchy may include summer clothes, winter clothes, outerwear, jackets, down jackets, leather jackets, jean jackets, and the like.

The entities in the unstructured database 102 are related to one another within a hierarchy. In the corporate structure example, the CEO, supervisors, and workers are related according to who is a direct supervisor of whom. For example, supervisor A may be the direct supervisor or workers 1 and 2, while supervisor B is the direct supervisor of worker 3. Both supervisor A and supervisor B report to the CEO. In the clothing example, winter clothes may be a top level in the hierarchy and include outerwear as a second level, jackets as a third level, and down jackets, leather jackets, and jean jackets as a fourth level. The analysis module 110 is configured to identify the entities and the relationships between the entities in the unstructured database 102. In some embodiments, the analysis module 110 also determines the level at which one or more entities (e.g., all of the entities) fits into the hierarchy.

In further embodiment, the decision engine 106 includes a flattening module 112. In some embodiments, the entities in the unstructured database 102 are described in a recursive pattern. This means that the data are not fully delineated in the unstructured database and results in difficulty in analyzing and presenting the data. For example, the CEO is the top level employee in a corporate hierarchy but may also perform tasks associated with the bottom-most level. The recursive hierarchy, however, does not depict that the CEO is able to perform the tasks associated with the bottom-most level because the CEO is depicted and the data stored with the CEO as the supervisor of all other employees. The flattening module 112 transforms the recursive hierarchy into a flattened hierarchy by fully delineating the entities in the unstructured database to make clear that upper levels may perform the tasks or fill the needs to levels below them. For example, a CEO may perform the tasks of a supervisor and a worker.

In an embodiment, the decision engine 106 includes a populating module 114. In some embodiments, the unstructured database 102 is not only recursive but also includes gaps in the relationships between entities. For example, an employee or group of employees may not have a direct supervisor disclosed in the data of the unstructured database 102. In this situation, the entity or entities cause the hierarchy to be ragged. Similarly, a branch of the hierarchy may have a different depth or unequal number of levels compared to another branch of the hierarchy, resulting in an unbalanced hierarchy. The populating module 114 is configured to populate the relationships between the unbalanced entities, ragged entities, and the rest of the hierarchy. In some embodiments, the populating module 114 populates the relationships via rules associated with the hierarchy. For example, the populating module 114 may populate the relationships between the top most level and the unbalanced and/or ragged hierarchy with the top level employees. In this example, the top-most employee in a ragged group of employees (i.e., a group that does not have a direct supervisor) may be made a supervisee of the CEO. The CEO may be populated into the levels above the top-most level in the unbalanced group. In this way, the relationships between all of the entities in the hierarchy are understood.

In some embodiments, the decision engine includes an output module 116. In an embodiment, the output module 116 varies the displayed data based on the results of the analysis, flattening, and populating modules. For example, a structured database may be displayed as a table that is able to be downloaded or transferred for further analysis. Similarly, a graphical depiction of the structured database may be provided.

Additional embodiments will now be described in further detail in order to provide additional concepts and examples related to how unstructured databases may be transformed in accordance with additional embodiments of the disclosure. One skilled in the art would understand that while this specification provides an example of transforming a single unstructured database into a single structured database, any two or more databases that are transformed may be used. For example, multiple unstructured databases may be transformed into a single structured database that includes entities and hierarchies from both unstructured databases.

Figure 2:
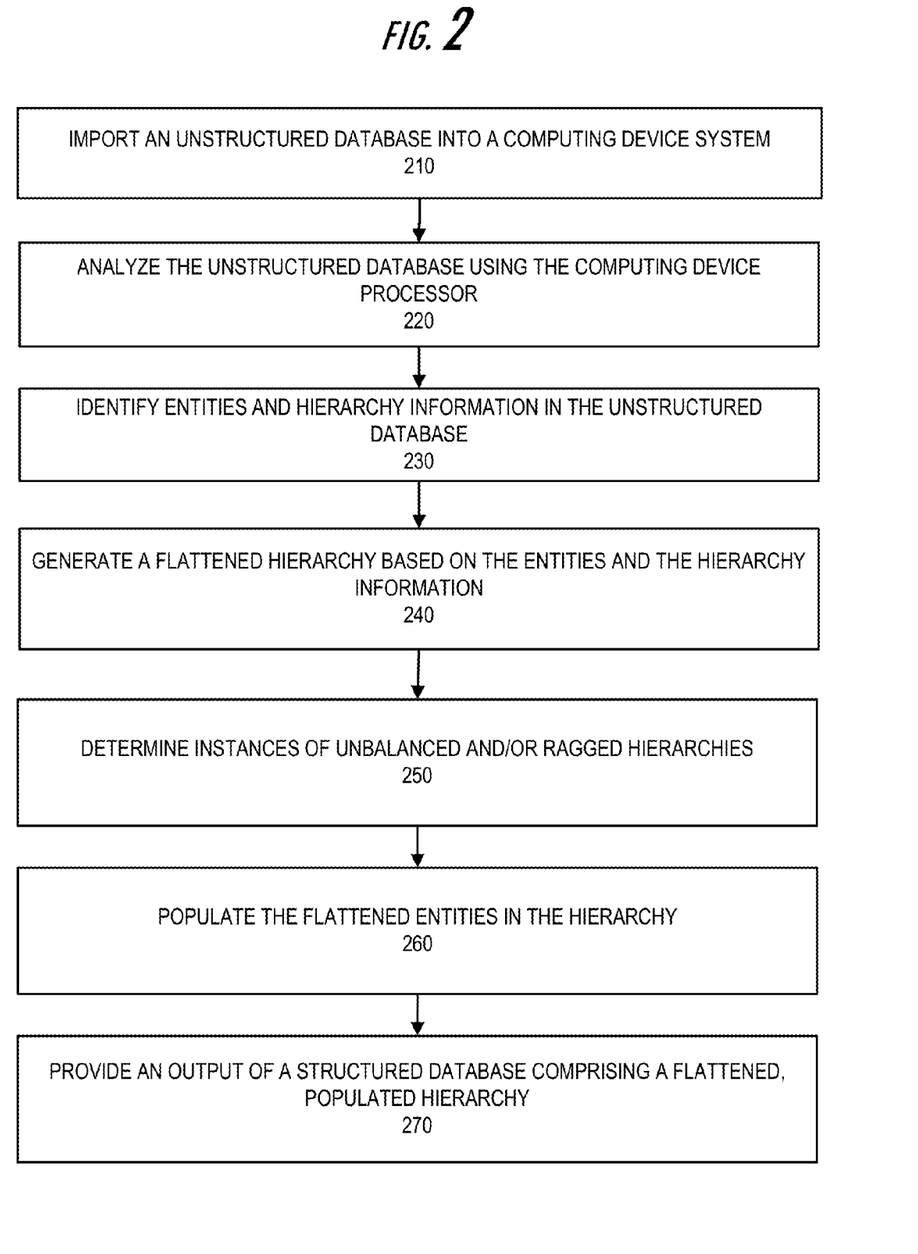
FIG. 2 provides a structured database transformation process in which an unstructured database is transformed into a structured database, in accordance with one embodiment of the present disclosure.

Turning now to FIG. 2, a system and method are disclosed for transforming an unstructured database into a structured database in accordance with an embodiment of the present disclosure. In some embodiments, the system and method transforms the unstructured database into the structured database by importing an unstructured database into a computing device system, the unstructured database comprising a plurality of entities in a hierarchy of levels below a highest level; analyzing the unstructured database to identify relationships between the entities in the hierarchy; generating a flattened database by expanding entities from higher levels into lower levels of the database such that every entity is present in a lowest level at least once; determining one or more instances of unbalanced or ragged hierarchies in the unstructured database, wherein: an unbalanced hierarchy is a hierarchy having branches of unequal length, and a ragged hierarchy is a hierarchy where at least one entity below the highest level does not have a direct supervisor; populating the flattened database according to one or more predetermined rules in order to develop relationships between the one or more instance of the unbalanced or ragged hierarchies and the remaining entities in the hierarchy; and providing an output of a structured database comprising the populated hierarchy.

In block 210, the system imports an unstructured database into a computing device system. In an embodiment, the system imports the unstructured database based on a user request. For example, a user may input an identifier for an unstructured database and the system identifies the unstructured database from the identifier. The unstructured database may be connected to, such as via a network, the system in order to facilitate updating of the unstructured database. In another embodiment, the system receives the unstructured database from the user. For example, an application developer may select a file for upload to a system.

In some embodiments, the unstructured database includes entities and/or relationships between entities within a hierarchy. The entities are the data that the database is intended to organize. For example, entities may be individuals in a corporate structure hierarchy, products in a business asset hierarchy, or information in a customer retention database. The information regarding the entities may also include the entities position in the hierarchy. For example, an individual may be determined to be in the fifth level in a hierarchy, or a product category may be determined to be in a second level of a hierarchy.

The unstructured database may also include information regarding the relationships between the entities in the hierarchy. As an example of a relationship, the hierarchy may indicate that individual A is the direct supervisor of individual B. Alternatively, the relationship may be categorical. For example, product A is a type of category B.

Figure 4:
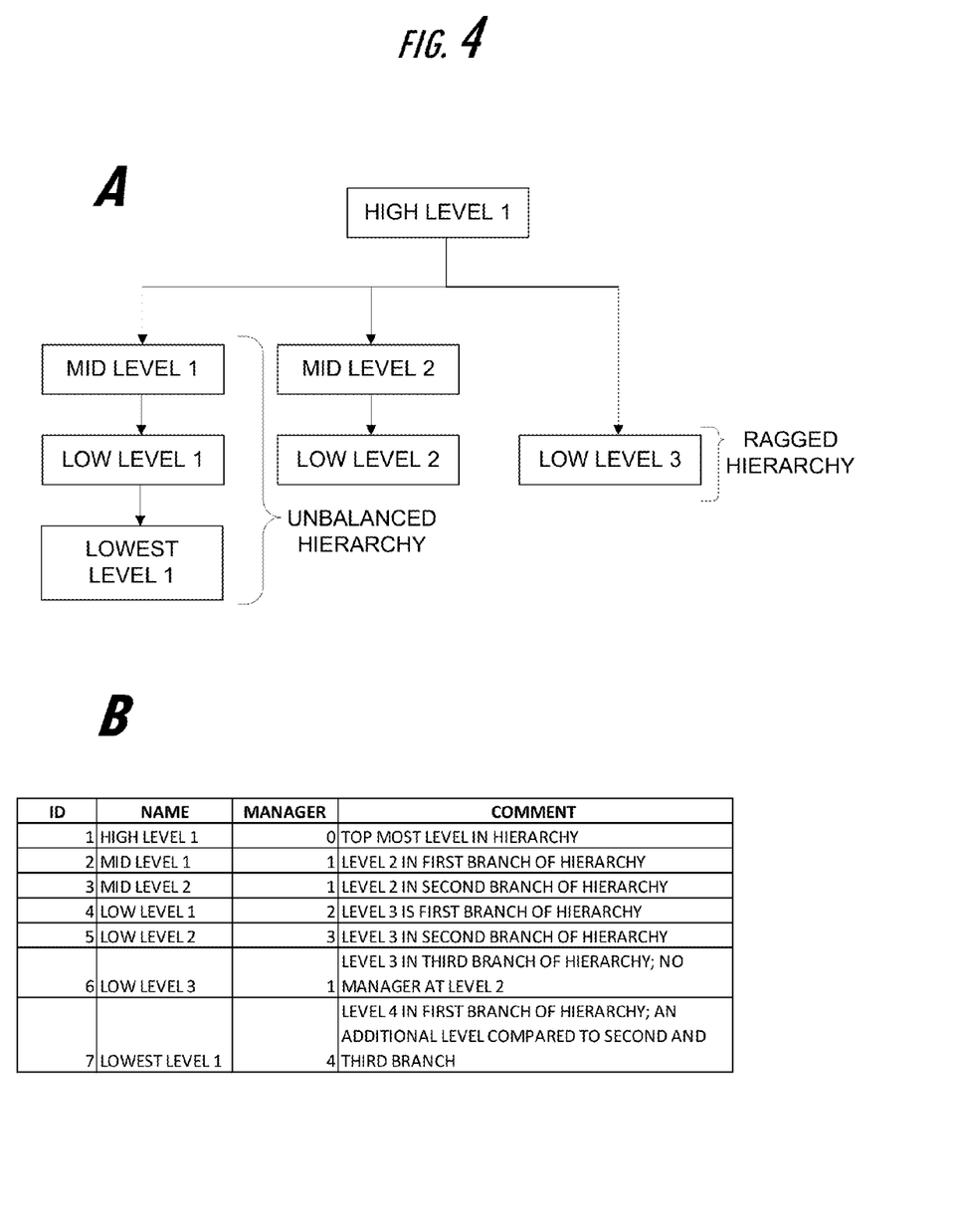
FIGS. 4A and 4B provide a graphical depiction of an unstructured database (A) and a table of underlying data in the unstructured database (B), in accordance with an embodiment of the present disclosure.

In some embodiments, an unstructured database is a database that is recursive, unbalanced, and/or ragged. FIG. 4B provides an example of a recursive database that lists entities and managers, but does not make clear that upper level entities in the database may also perform lower level tasks and fulfill lower level categories. For example, a CEO is at the highest level of a corporate structure hierarchy but the CEO may also perform lower level tasks. A recursive hierarchy does not disclose that the CEO may perform these lower level tasks but always shows the CEO as the top-most level with levels underneath for subordinates. A flattened hierarchy makes clear that the CEO has subordinates underneath the upper level but also that the CEO may perform the tasks of subordinates as well.

Figure 5:
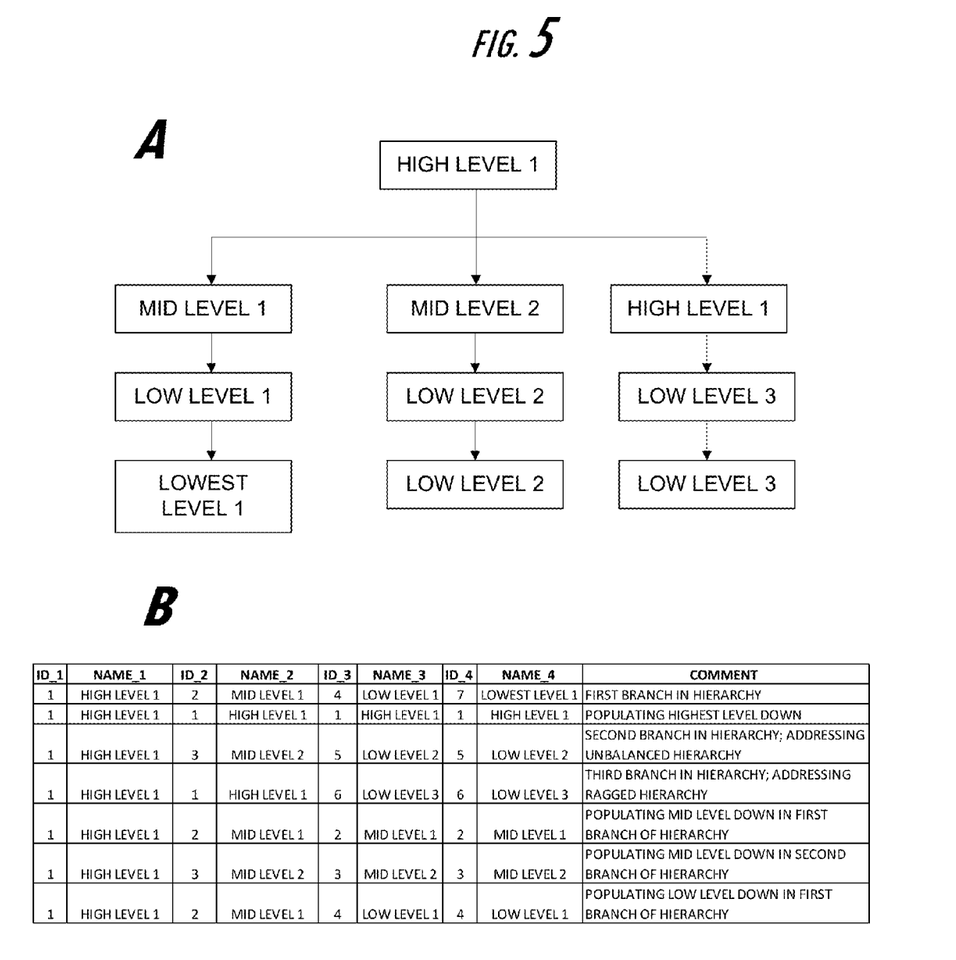
FIGS. 5A and 5B provide a graphical depiction of a structured database (A) and a table of underlying data in the structured database (B), in accordance with an embodiment of the present disclosure.

FIG. 4A depicts an example of an unbalanced, ragged hierarchy having three branches and FIG. 4B depicts an example of the underlying data in the recursive table (with comments) making up the hierarchy. As shown in FIG. 4B, ID 1 is the highest level in the hierarchy but there is no indication that ID 1 is capable of performing the tasks associated with the lower levels in the hierarchy, such as mid level, low level, or lowest level. In contrast, FIG. 5B shows the underlying data making up a flattened hierarchy. As shown in FIG. 5B, the high level 1 is shown to be capable of performing tasks at each level by being populated downward in row 2.

An unbalanced hierarchy is a hierarchy having branches of unequal length. For example, one branch may have five levels or depths and a second branch may have four levels or depths. An example of an unbalanced hierarchy is provided in FIG. 4A and FIG. 4B. As shown in FIG. 4A, the first branch comprising the high level 1, mid level 1, low level 1, and lowest level 1 includes four depths or levels. The second branch, however, includes high level 1, mid level 2, and low level 2, which is only three levels. This difference in the number of levels results in inconsistent analysis and review of assigned tasks and responsibilities. In contrast, FIG. 5A and FIG. 5B show a balanced hierarchy where every entity is integrated into the hierarchy and each branch includes the same number of levels. As shown in FIG. 5A, the levels in each branch that would be otherwise empty due to the unbalanced hierarchy are populated according to predefined rules that input entities into the hierarchy in a manner that balances the hierarchy.

A ragged hierarchy is a hierarchy where at least one entity below a highest level does not have a direct supervisor. In some embodiments, the unstructured database includes information on the position of an entity in a ragged hierarchy, e.g., third level, but not the associations between the entity and an immediate supervisor. For example, in a hierarchy of country, state, city, some cities may be independent territories of the country and therefore not have a state associated with them (e.g., New Delhi is a city in the country of India, but does not have a state associated with it). In some embodiments, the relationships between the upper level entity (e.g., country) and the lower level entity (e.g., city) is indicated in the hierarchy (e.g., the hierarchy indicates that the city is a part of the country by bypassing the state level). In other embodiments, a group of individuals in a corporate structure hierarchy may be related to one another (e.g., supervisor, subordinate) but not associated with the remainder of the hierarchy. There may be no information on how the unstructured group of individuals relates to the other individuals in the corporate structure hierarchy.

FIG. 4A and FIG. 4B provide an example of a ragged hierarchy. As shown in FIG. 4A, low level 3 is known to exist in the third level of the hierarchy but no information is provided regarding a direct supervisor between low level 3 and high level 1. In other words, the entity in the second level of the third branch of the hierarchy is not present. In this way, the entity is difficult to analyze within the hierarchy. Counts of the second level may be inconsistent with counts of other levels. FIG. 5A and FIG. 5B show how a ragged hierarchy may be transformed into a structured database. In FIG. 5A, high level 1 is populated into the empty slot in the second level of the third branch based on the rule that all entities in a hierarchy ultimately are under the highest level. In this way, low level 3 has a direct supervisor and every level is populated with an entity.

In some embodiments, the system imports the unstructured database upon request of the user. In some embodiments, the system imports unstructured databases on a regular schedule or upon a triggering event. For example, a system may monitor a database that is constantly or frequently being updated, e.g., a stock database. In some embodiments, errors such as unbalanced and/or ragged hierarchies occur in the database. When a certain or predetermined level of errors are detected, the system may automatically import the database and transform the database into a structured database by addressing the unbalanced and/or ragged hierarchies.

In block 220, the system analyzes the unstructured database using the computing device processor. In some embodiments, the system evaluates each line in a spreadsheet or table. In some embodiments, the system evaluates more than one spreadsheet or table, such as a spreadsheet for each level or a spreadsheet that discloses the entities and a spreadsheet that discloses the relationships between entities. In an embodiment, each entity is identified, each entities location in the database is ascertained, and the relationships between each entity to at least one other entity are determined.

In block 230, the system identifies entities and hierarchy information in the unstructured database. In some embodiments, the system captures each entity based on textual analysis. For example, comparison of names and or ID number may be used to identify unique entities within the unstructured database. In some embodiments, the system identifies entities based on a graphical depiction of the hierarchy.

In some embodiments, the system identifies the hierarchy information based on constructing relationships between entities. For example, the unstructured database may include relationship information between entities, but not level information. In this example, different types of jackets may be related to the outerwear category in the hierarchy but there is no information indicating that the jackets are on the same level. The system may identify the relationship of each jacket to the outerwear category and determine that the jackets are on the same level.

In block 240, the system generates a flattened hierarchy based on the entities and the hierarchy information. In some embodiments, the system identifies the recursive nature of the unstructured database and flattens it by providing full information on each entity. For example, the CEO at the top level will also be filled into a data structure that indicates the CEO may also perform the tasks of lower levels. In some embodiments, each level above the lowest or most detailed level will be expanded to include the lower levels. In this example, mid level supervisors are also capable of performing low level tasks and therefore would be expanded to include both the mid level position in the hierarchy and the low level position in the hierarchy. This is shown in FIG. 5B, where high level and mid level entities have a row that also shows the high level and mid level entities in the column indicating the lowest level in the hierarchy. In this manner, there will be a total number of rows in a database at least equal to the number of entities in the database, as each entity will be in the lowest level at least once.

In block 250, the system determines instances of unbalanced and/or ragged hierarchies. As discussed, after flattening the hierarchy the system may determine instances of unbalanced and/or ragged hierarchies. In some embodiments, the unbalanced and/or ragged hierarchies are automatically determined by the system. In some embodiments, the unbalanced and/or ragged hierarchies are identified by a user and input into the system. For example, the user may input a new individual into a corporate hierarchy at a specific level but not know the full hierarchy. The system then determines the hierarchy on behalf of the user.

In block 260, the system populates the flattened entities in the hierarchy. In some embodiments, the system populates the flattened hierarchy to address the unbalanced and/or ragged hierarchies. In an embodiment, the system populates the flattened entities in the hierarchy according to predetermined rules in order to clarify the relationships between unbalanced portions of the hierarchy and the remaining portions of the hierarchy. In some embodiments, the system populates the flattened entities according to predetermined rules in order to input the ragged entities or groups of entities into the full hierarchy.

In some embodiments, one or more rules determine how the hierarchy will be populated. For example, the system may include a rule that every entity in the hierarchy is ultimately reporting to the highest level entity. In some embodiments, this is the CEO. For example, a ragged hierarchy like shown in FIG. 4A may include an employee in the third level (low level 3) that does not have a direct supervisor. This hierarchy is ragged because the slot at level 2 of the third branch is empty and therefore the relationship to the highest level in the hierarchy (high level 1) is unclear. According to the rule, however, the low level 3 is ultimately reporting to the highest level and therefore high level 1 is placed into the empty slot, as shown in FIG. 5A. In some embodiments, the rules clarify that a ragged or unbalanced entity or groups of entities will ultimately report to the highest level. In other embodiments, the rules identify a lower level or alternate level that determine to whom the unbalanced or ragged entities report to. For example, a vice president may be below the CEO in the hierarchy but identified as the supervisor of any unbalanced or ragged entities. Similarly, a specific individual or category may be identified as the default supervisor/superior of an unbalanced or ragged entity. As shown based on the comparison between FIG. 4A and FIG. 5A, unbalanced hierarchies are also addressed by populating the lowest entity in each branch to the maximum number of levels in the hierarchy, in accordance with some embodiments of this disclosure. For example, low level 2 and low level 3 are populated downward into the fourth level of the hierarchy in branches 2 and 3, respectively, to balance the hierarchy and eliminate any empty slots. The rules associated with populating the flattened entities may be provided by the system or the user.

In block 270, the system provides an output of a structured database comprising a flattened, populated hierarchy. In some embodiments, the output is modified based on the results of the analysis, flattening, and populating. In some embodiments, a graphical user interface (GUI) is provided to a user for evaluating and/or accessing the structured database. In an embodiment, the information displayed on the graphical user interface is modified based on the results of the analysis. For example, populated entities may be displayed in a different color or with another indicator denoting that the entities in the hierarchy were populated based on the analysis and not present in the data of the unstructured database. The output may be a file that can be downloaded or transferred to another computing system for analysis. In some embodiments, the output of the system is used for tracking of individuals and/or products in a business.

Advantageously, the system transforms an unstructured database into a structured database in a specific and detailed manner. The results of the analysis transform the data and produce an output that is both physically different, e.g., the GUI and output hierarchy, and functionally different, e.g., the structured database can be used to analyze employees, stock, and the like more efficiently and with fewer errors than the unstructured database. The rules associated with transforming the unstructured database into a structured database can be default rules provided by the system or can be rules determined by the user.

Figure 3:
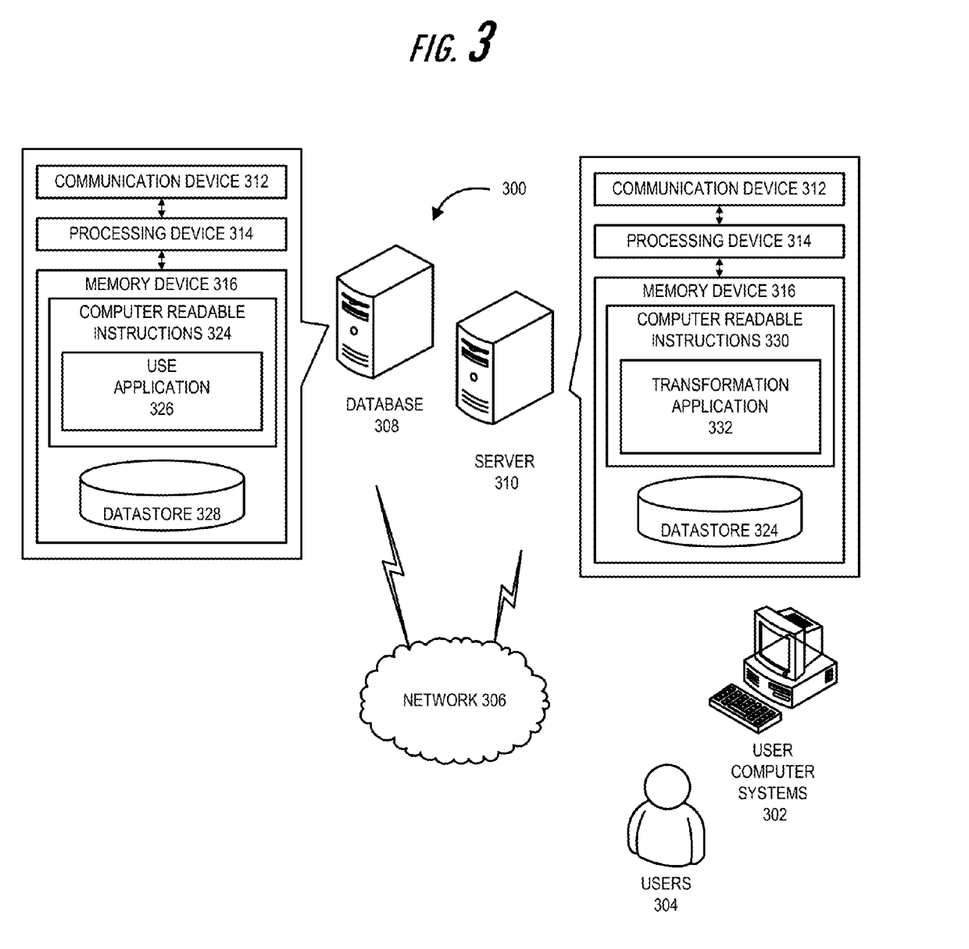
FIG. 3 provides a block diagram for a structured database environment and system, in accordance with one embodiment of the present disclosure.

FIG. 3 illustrates a system 300 for transforming an unstructured database into a structured database, in accordance with an embodiment of the present disclosure. As illustrated in FIG. 3, the computer systems 302 of users 304 are operatively coupled, via a network 306, to the database 308 and the server 310. In this way, the users 304 may utilize the user computer systems 302 to transform unstructured database 308 into a structured database using the server 310. FIG. 3 illustrates only one example of embodiments of a unstructured database transformation system 300, and it will be appreciated that in other embodiments one or more of the systems (e.g., computers, mobile devices, servers, or other like systems) may be combined into a single system or be made up of multiple systems.

The network 306 may be a global area network (GAN), such as the Internet, a wide area network (WAN), a local area network (LAN), or any other type of network or combination of networks. The network 306 may provide for wireline, wireless, or a combination of wireline and wireless communication between devices on the network.

As illustrated in FIG. 3, the user computer systems 302 generally comprise a communication device 312, a processing device 314, and a memory device 316. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 314 is operatively coupled to the communication device 312 and the memory device 316. The processing device 314 uses the communication device 312 to communicate with the network 306 and other devices on the network 306, such as, but not limited to, the unstructured database 308 and the server 310. As such, the communication device 312 generally comprises a modem, server, or other device for communicating with other devices on the network 306, and a display, camera, keypad, mouse, keyboard, microphone, and/or speakers for communicating with one or more users 304. The user computer systems 302 may include, for example, a personal device, which may be a personal computer, a laptop, a mobile device (e.g., phone, smartphone, tablet, or personal display device ("PDA"), or the like) or other like devices whether or not the devices are mentioned within this specification. In some embodiments, the user computer systems 302 could include a data capture device that is operatively coupled to the communication device 312, processing device 314, and the memory device 316. The data capture device could include devices such as, but not limited to a location determining device, such as a radio frequency identification ("RFID") device, a global positioning satellite ("GPS") device, Wi-Fi triangulation device, or the like, which can be used by a user 304, institution, or the like to capture information from a user 304, such as but not limited to the location of the user 304.

As further illustrated in FIG. 3, the user computer systems 302 comprises computer-readable instructions 330 stored in the memory device 316, which in one embodiment includes the computer-readable instructions 330 of an unstructured database transformation application 332 (e.g., an application that transforms an unstructured database into a structured database). In some embodiments, the memory device 316 includes a datastore 325 for storing data related to the user computer system 302, including but not limited to data created and/or used by transformation application 332.

As further illustrated in FIG. 3, the database 308 generally includes a communication device 312, a processing device 314, and a memory device 316. The processing device 314 is operatively coupled to the communication device 312 and the memory device 316. The processing device 314 uses the communication device 312 to communicate with the network 306, and other devices on the network 306. As such, the communication device 312 generally comprises a modem, server, or other device(s) for communicating with other devices on the network 306.

As illustrated in FIG. 3, the database 308 includes computer-readable program instructions 324 stored in the memory device 316, which in one embodiment includes the computer-readable instructions 324 of a use application 326. In some embodiments, the memory device 316 includes a datastore 328 for storing data related to the database 308, including but not limited to data created and/or used by the use application 326. The use application 326 may be any type of application that uses the database in structured or unstructured form. For example, the use application 326 may be an application directed to re-ordering stock when it is low in a store. The use application 326 analyzes the structured or unstructured database in the database 308 and determines when stock should be ordered. Having a structured database makes the ordering process my likely to be correct because the full extent and relationships between products are known.

Figure 6:
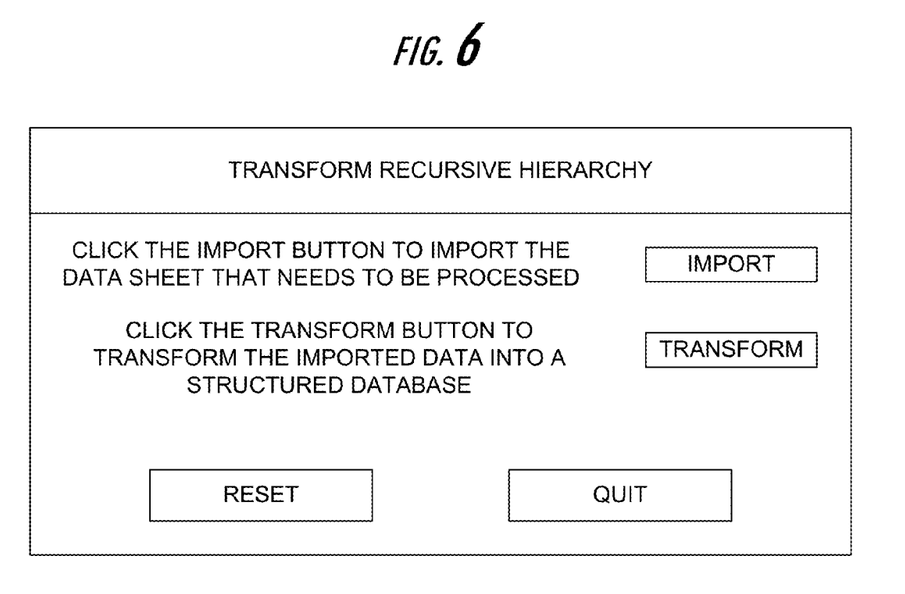
FIG. 6 provides an exemplary screenshot of an interactive window for importing and transforming unstructured databases, in accordance with one embodiment of the present disclosure.

Turning now to FIG. 6, an exemplary screenshot of an input screen for inputting the unstructured database is provided, in accordance with an embodiment of the disclosure. As shown in FIG. 6, the user imports the unstructured database by selecting a file for input into the system. Once the file is selected for import, the user can cause the system to transform the file by selecting the transform button. In some embodiments, the system permits the user to reset or quit the system to halt or delay the transformation of the unstructured database into the structured database.

It is understood that the servers, systems, and devices described herein illustrate one embodiment. It is further understood that one or more of the servers, systems, and devices can be combined in other embodiments and still function in the same or similar way as the embodiments described herein.

As will be appreciated by one of skill in the art, the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, resident software, micro-code, etc.), or an embodiment combining software and hardware aspects that may generally be referred to herein as a "system." For example, various embodiments may take the form of web-implemented computer software. Furthermore, embodiments of the present disclosure may take the form of a computer program product on a computer-readable medium having computer-executable program code embodied in the medium.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as, for example, a propagation signal including computer-executable program code portions embodied therein.

One or more computer-executable program code portions for carrying out operations of the present disclosure may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F#.

Some embodiments of the present disclosure are described herein with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present disclosure.

As used herein, a processor/computer, which may include one or more processors/computers, may be "configured to" perform a stated function in a variety of ways, including, for example, by having one or more general-purpose circuits perform the stated function by executing one or more computer-executable program code portions embodied in a computer-readable medium, and/or by having one or more application-specific circuits perform the stated function.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the disclosure. Therefore, it is to be understood that, within the scope of the appended claims, the disclosure may be practiced other than as specifically described herein.

What is claimed is:

1. An apparatus for transforming an unstructured database, wherein the apparatus transforms the unstructured database into a structured database, the apparatus comprising:
    a memory;
    a computing processor; and
    a module stored in the memory, said module comprising instruction code executable by one or more computing processors, and configured to cause the one or more computing processors to:
        import an unstructured database into a computing device system, the unstructured database comprising a plurality of entities in an overall hierarchy comprising a highest level and a plurality of levels below the highest level;
        analyze the unstructured database to identify relationships between the plurality of entities in the overall hierarchy;
        generate a flattened database by expanding the plurality of entities from higher levels into lower levels of the overall hierarchy such that every entity is present in a lowest level at least once;
        determine one or more instances of unbalanced hierarchy portions and one or more instances of ragged hierarchy portions in the overall hierarchy of the unstructured database, wherein:
            the one or more instances of unbalanced hierarchy portions are hierarchy portions having branches of unequal length, and
            the one or more instances of ragged hierarchy portions are hierarchy portions where at least one entity below the highest level does not have a direct supervisor;
        populate the flattened database according to one or more predetermined rules in order to develop relationships between the one or more instances of unbalanced hierarchy portions, the one or more instances of ragged hierarchy portions and remaining entities of the plurality of entities in the overall hierarchy, wherein the one or more predetermined rules specify that entities in unbalanced hierarchy portions and ragged hierarchy portions will be subordinate to the highest level in the overall hierarchy, and wherein the populating fills empty slots in the overall hierarchy with a next entity in a higher level in a same branch; and
        provide an output of a structured database comprising the populated flattened database.

2. The apparatus of claim 1, wherein the plurality of entities comprise individuals in a corporate structure hierarchy, and the plurality of levels in the overall hierarchy comprise supervisors and subordinates.

3. The apparatus of claim 1, wherein the output is a graphical user interface that modifies a presentation based on the populated flattened database.

4. The apparatus of claim 1, wherein importing the unstructured database comprises receiving a link to the unstructured database from a user.

5. The apparatus of claim 1, wherein the module further comprises instruction code executable by one or more computing processors, and configured to cause the one or more computing processors to:
    query a user for a level of an entity in a ragged hierarchy portion when the entity in the ragged hierarchy portion is not defined by a level in the unstructured database.

6. The apparatus of claim 1, wherein the output of the structured database comprising the populated flattened database further comprises a display of a table.

7. The apparatus of claim 1, wherein the plurality of entities comprise products in a business asset hierarchy.

8. A computer program product for transforming an unstructured database into a structured database, the computer program product comprising:
    a non-transitory computer-readable medium comprising:
        an executable portion for causing a computer to import an unstructured database into a computing device system, the unstructured database comprising a plurality of entities in an overall hierarchy comprising a highest level and a plurality of levels below the highest level;

an executable portion for causing the computer to analyze the unstructured database to identify relationships between the plurality of entities in the overall hierarchy;

an executable portion for causing the computer to generate a flattened database by expanding the plurality of entities from higher levels into lower levels of the overall hierarchy such that every entity is present in a lowest level at least once;

an executable portion for causing the computer to determine one or more instances of unbalanced hierarchy portions and one or more instances of ragged hierarchy portions in the overall hierarchy of the unstructured database, wherein:

the one or more instances of unbalanced hierarchy portions are hierarchy portions having branches of unequal length, and the one or more instances of ragged hierarchy portions are hierarchy portions where at least one entity below the highest level does not have a direct supervisor;

an executable portion for causing the computer to populate the flattened database according to one or more predetermined rules in order to develop relationships between the one or more instances of unbalanced hierarchy portions, the one or more instances of the ragged hierarchy portions, and remaining entities of the plurality of entities in the overall hierarchy, wherein the one or more predetermined rules specify that entities in unbalanced hierarchy portions and ragged hierarchy portions will be subordinate to the highest level in the overall hierarchy, and wherein the populating fills empty slots in the overall hierarchy with a next entity in a higher level in a same branch; and an executable portion for causing the computer to provide an output of a structured database comprising the populated flattened database.

9. The computer program product according to claim 8, wherein the plurality of entities comprise individuals in a corporate structure hierarchy, and the plurality of levels in the overall hierarchy comprise supervisors and subordinates.

10. The computer program product according to claim 8, wherein the output is a graphical user interface that modifies a presentation based on the populated flattened database.

11. The computer-program product according to claim 8, wherein importing the unstructured database comprises receiving a link to the unstructured database from a user.

12. The computer-program product according to claim 8, wherein the non-transitory computer-readable medium further comprises:

an executable portion for causing the computer to query a user for a level of an entity in a ragged hierarchy portion when the entity in the ragged hierarchy portion is not defined by a level in the unstructured database.

13. The computer-program product according to claim 8, wherein the output of the structured database comprising the populated flattened database further comprises a display of a table.

14. The computer-program product according to claim 8, wherein the plurality of entities comprise products in a business asset hierarchy.

15. A computer-implemented method for transforming an unstructured database into a structured database, the method comprising:

importing an unstructured database into a computing device system, the unstructured database comprising a plurality of entities in an overall hierarchy comprising a highest level and a plurality of levels below the highest level;

analyzing the unstructured database to identify relationships between the plurality of entities in the overall hierarchy;

generating a flattened database by expanding the plurality of entities from higher levels into lower levels of the overall hierarchy such that every entity is present in a lowest level at least once;

determining one or more instances of unbalanced hierarchy portions and one or more instances of ragged hierarchy portions in the overall hierarchy of the unstructured database, wherein:

the one or more instances of unbalanced hierarchy portions are hierarchy portions having branches of unequal length, and the one or more instances of ragged hierarchy portions are hierarchy portions where at least one entity below the highest level does not have a direct supervisor;

populating the flattened database according to one or more predetermined rules in order to develop relationships between the one or more instances of unbalanced hierarchy portions, the one or more instances of the ragged hierarchy portions and remaining entities of the plurality of entities in the overall hierarchy, wherein the one or more predetermined rules specify that entities in unbalanced hierarchy portions and ragged hierarchy portions will be subordinate to the highest level in the overall hierarchy, and wherein the populating fills empty slots in the overall hierarchy with a next entity in a higher level in a same branch; and providing an output of a structured database comprising the populated flattened database.

16. The computer-implemented method of claim 15, wherein the plurality of entities comprise individuals in a corporate structure hierarchy, and the plurality of levels in the overall hierarchy comprise supervisors and subordinates.

17. The computer-implemented method of claim 15, wherein the output is a graphical user interface that modifies a presentation based on the populated flattened database.

18. The computer-implemented method of claim 15, wherein importing the unstructured database comprises receiving a link to the unstructured database from a user.

19. The computer-implemented method of claim 15, wherein the output of the structured database comprising the populated flattened database further comprises a display of a table.

20. The computer-implemented method of claim 15, wherein the plurality of entities comprise products in a business asset hierarchy.

* * * * *